United States Patent [19]
Washkewicz et al.

[11] 4,142,554
[45] Mar. 6, 1979

[54] HOSE CONSTRUCTION

[75] Inventors: Donald E. Washkewicz, Bedford Heights; Wayne S. Busdiecker, Euclid, both of Ohio

[73] Assignee: Parker-Hannifin Corporation, Cleveland, Ohio

[21] Appl. No.: 846,310

[22] Filed: Oct. 28, 1977

[51] Int. Cl.[2] .................... F16L 11/08; F16L 39/00

[52] U.S. Cl. .................... 138/109; 138/125; 138/141; 285/149; 428/36

[58] Field of Search .............. 138/109, 123, 124, 125, 138/126; 285/149; 428/36

[56] References Cited

U.S. PATENT DOCUMENTS

| | | | |
|---|---|---|---|
| 2,393,496 | 1/1946 | Stedman | 138/126 |
| 3,111,143 | 11/1963 | Frieder et al. | 138/124 |
| 3,186,438 | 6/1965 | Holmgren | 138/125 |
| 3,252,720 | 5/1966 | Waite | 138/125 |
| 3,966,238 | 6/1976 | Washkewicz et al. | 138/125 |

*Primary Examiner*—William R. Dixon, Jr.
*Attorney, Agent, or Firm*—John N. Wolfram

[57] ABSTRACT

A flexible composite hose which can be connected to a swageable fitting without creating a weakness in the hose adjacent the end of the fitting. The hose utilizes two or more braided reinforcement layers comprised of yarn formed from twisted strands of reinforcing material. During swaging, the twisted yarn in each reinforcement layer interlocks with the twisted yarn of the adjacent reinforcement layer preventing relative longitudinal motion therebetween and bunching of the reinforcement material which would create a weakness in the hose structure.

5 Claims, 11 Drawing Figures

24 22 20 26 28 10 18 36 34 12

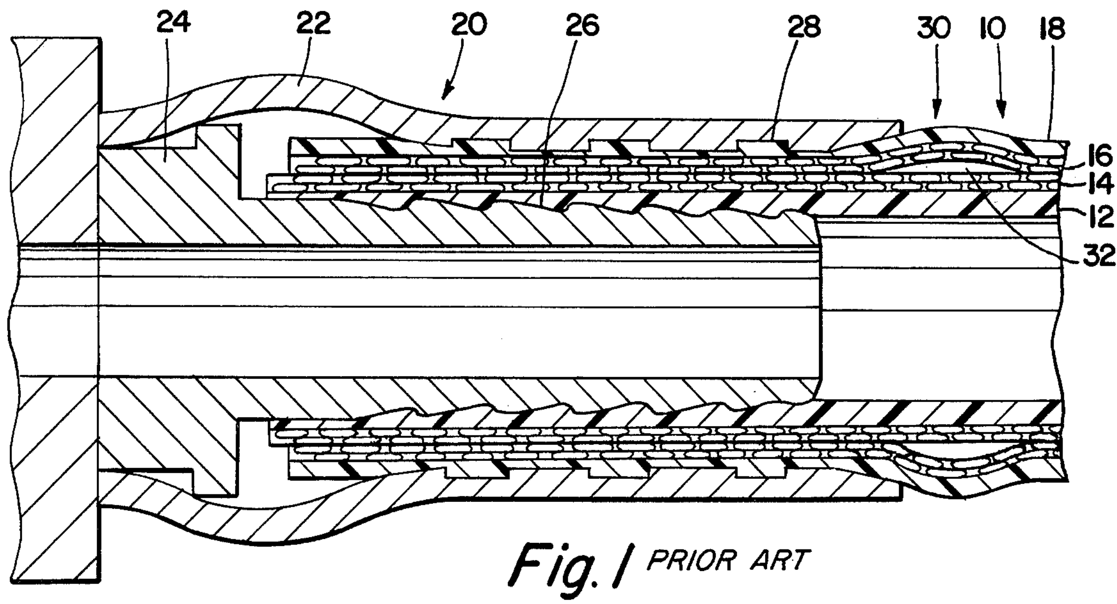
Fig. 1 PRIOR ART
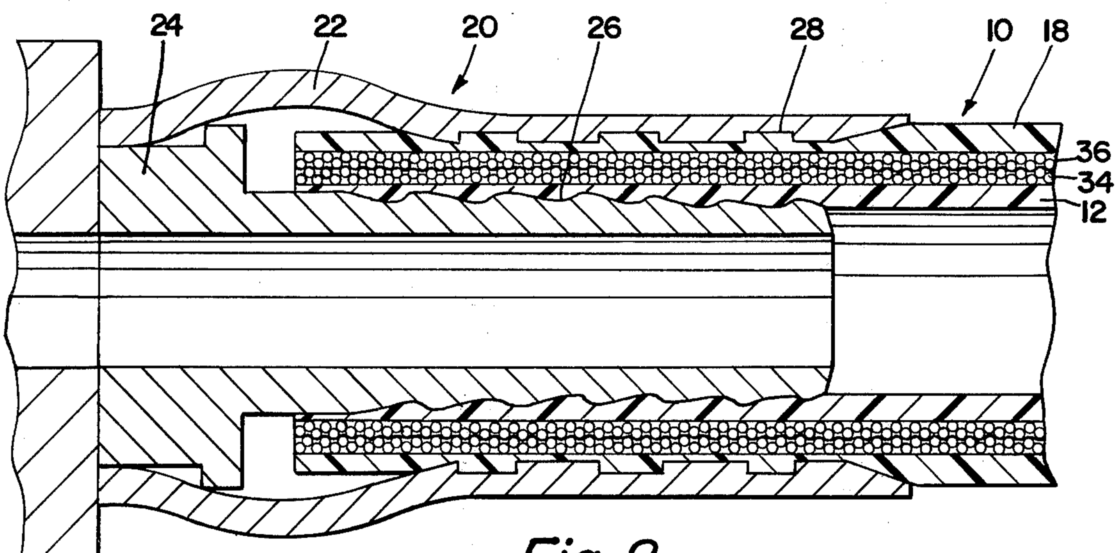
Fig. 2
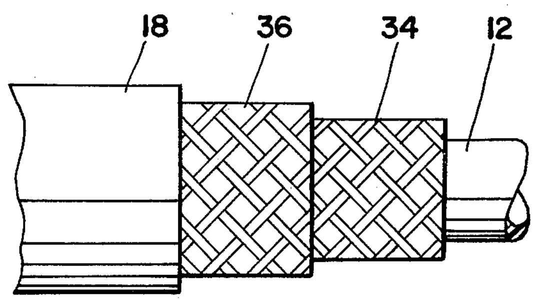
Fig. 3
Fig. 10
Fig. 11

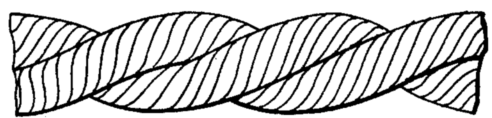
Fig. 8
Fig. 9
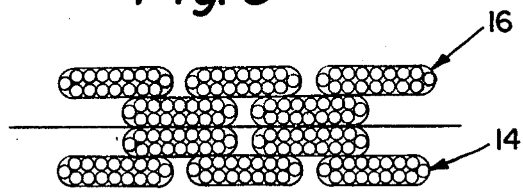
Fig. 4 PRIOR ART
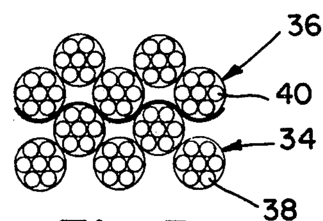
Fig. 5
Fig. 6
Fig. 7

HOSE CONSTRUCTION

BACKGROUND OF THE INVENTION

1. Field of the Invention

This invention relates to a hose construction and more particularly to a hose construction in which relative movement between the layers thereof is minimized when the hose is connected to a swaged fitting.

2. Description of the Prior Art

It has been found that failure of high pressure thermoplastic hose assemblies employing swaged fittings usually occurs at or near the connection between the hose and the fitting. The reason for this type of failure can be attributed to the swaging process and the relative movement between the hose layers which occurs during this process. During swaging, the shell of the fitting moves longitudinally in the direction of the free hose. This longitudinal movement forces the hose layers to move relative to one another in the longitudinal direction causing a bunching of the reinforcement material at or near the end of the shell. This bunching lessens the tension applied by the reinforcement to the core tube at the point where bunching occurs. When the hose is subsequently pressurized, the core tube will expand until sufficient resistance is supplied by the reinforcement. Such expansion of the core tube results in a corresponding decrease in core tube wall thickness at the bunching point. Thus, upon pressurization, the hose will bulge at this point. When the pressure is released, the core tube exhibits a tendency to return to its initial relaxed state. Repeated pressurization of the hose causes the core tube to fatigue and allows the molecules in the core tube to orient in the longitudinal direction which decreases the strength of the hose to radially directed forces in the area where the reinforcement has bunched and results in eventual hose failure.

Various approaches have been taken to alleviate this problem of bunching of the reinforcement material. For example, the reinforcement can be chemically bonded to the core tube. This limits the amount of relative movement between the first reinforcement layer and the core tube but each additional layer of reinforcement material can move longitudinally relative to its adjacent reinforcement layer causing bunching of the succeeding reinforcement layers resulting in lessening of the tension applied by the succeeding layers. Such relative longitudinal movement between the reinforcement layers can be minimized by bonding the layers together, however, such bonding makes the resultant hose structure relatively inflexible and bulky.

Because hose assemblies using swaged fittings have a tendency to fail near the fitting due to bunching of the reinforcement material in this area during the swaging process, it has become desirable to develop a hose structure in which the reinforcement layers remain engaged to the core tube and to each other during the swaging process while retaining flexibility.

SUMMARY OF THE INVENTION

The present invention provides a solution to the problem of maintaining firm engagement between the reinforcement and the core tube and between the reinforcement layers during the swaging process without substantially reducing hose flexibility. This is accomplished by cementing the first reinforcement layer to the core tube, and by using twisted yarn rather than roto-set or producer's twist yarn for the reinforcement layers. By using twisted yarn, the resulting reinforcement layers are actually in a bundled configuration and grip or interlock each other preventing relative longitudinal movement therebetween without impairing hose flexibility. The resulting hose structure is not susceptible to failure at the fitting connection and is relatively flexible.

BRIEF DESCRIPTION OF THE DRAWINGS

FIG. 1 is a cross-sectional view illustrating a typical connection between a hose and a swaged fitting showing the bulging of the hose reinforcement and the outer sheath adjacent the end of the fitting.

FIG. 2 is a cross-sectional view illustrating the connection of a hose made in accordance with the present invention with a swaged fitting showing the lack of bulging of the hose layers at the fitting.

FIG. 3 is a side view, partly broke away in successive structional layers, of a hose made in accordance with the present invention.

FIG. 4 is a cross-sectional view taken through roto-set yarn showing the relative flatness of such yarn.

FIG. 5 is a cross-sectional view of twisted yarn formed from a multiplicity of strands and made in accordance with the present invention.

FIG. 6 is an elevation view of a single strand of twisted yarn having between two to five twists per inch.

FIG. 7 is an end view of the single strand of twisted yarn shown in FIG. 6.

FIG. 8 is an elevation view of a double strand of twisted yarn having between two to five twists per inch.

FIG. 9 is an end view of the double strand of twisted yarn shown in FIG. 8.

FIG. 10 is an elevation view of roto-set yarn or producer's twist yarn having approximately one-half (½) twist per inch.

FIG. 11 is an end view of the roto-set yarn or producer's twist yarn shown in FIG. 10.

DESCRIPTION OF THE PREFERRED EMBODIMENT

Referring now to the drawings, FIG. 1 illustrates a hose 10 having a core tube 12, a first layer of reinforcement material 14, a second layer of reinforcement material 16, and an outer sheath 18. The material utilized for the core tube 12 and outer sheath 18 may be selected from any of the well-known synthetic polymers used in the hose industry to produce reinforced hose, such an Nylon 6/66, Nylon 11, Hytrel, polyurethane, or the like. The material selected for the sheath 18 may be the same as or different from the material chosen for the core tube 12, Reinforcement layers 14 and 16 are composed of synthetic filaments, such as nylon, Dacron, rayon, or Kevlar, supplied as untwisted roto-set yarn or producer's twist yarn, which has a minimal number of twists, such as one-half (½) twist per inch, as shown in FIG. 10. Kevlar is a fibrous aromatic nylon or aramid yarn that is available from the E. I. duPont de Nemours Company and was formerly designated by duPont as Fiber B Nylon. Reinforcement layers 14 and 16 may be braided or spirally wound about core tube 12 and layer 14 is bonded thereto by a suitable adhesive, however, reinforcement layers 14 and 16 are not bonded together.

Fitting 20 is comprised of a shell 22 and a nipple 24 which is positioned generally centrally therein. Before swaging, nipple 24 is received in core tube 12 and securely engages the interior thereof by means of barbs 26 provided on the periphery thereof. During swaging, shell 22 moves longitudinally in the direction of the free hose and radially inwardly to grip outer sheath 18 by means of annular recesses 28 provided on the interior thereof. This longitudinal movement of shell 22 causes outer sheath 18 and reinforcement layers 14,16 to move longitudinally relative to one another. Since a roto-set yarn, which is a flat untwisted yarn as shown in FIG. 4, is used for reinforcement layers 14,16, substantial relative longitudinal movement can occur therebetween resulting in the bunching of reinforcement material comprising layer 16 in the area shown generally by the numeral 30, causing a gap 32 between reinforcement layers 14 and 16. This bunching of reinforcement material lessens the tension of the reinforcement yarn about the core tube 12 allowing the portion of core tube 12 adjacent this bunching to expand upon pressurization of hose 10. When such pressure is released, core tube 12 exhibits a tendency to revert to its original relaxed state. Repeated pressure cycling of the hose causes core tube fatigue and allows the molecules in the core tube to orient in the longitudinal direction which decreases the strength of the hose to radially directed forces in the area of reinforcement bunching and results in eventual hose failure.

The preferred embodiment of the invention is illustrated in FIG. 2 wherein those hose and fitting components which are similar to those previously enumerated are given like numerals and will not be reviewed further. In this embodiment, reinforcement layers 34 and 36 are composed of synthetic filaments such as nylon, Dacron, rayon, or Kevlar, but the yarn is a twisted yarn that has a substantially greater number of twists than producer's twist yarn. For example, the twisted yarn used in the preferred embodiment of the invention has between two to five twists per inch, depending upon the synthetic filaments utilized. The twisted yarn is comprised of a single twisted strand, as shown in FIG. 6, or two or more strands twisted together, as shown in FIG. 8. A hose construction using a multiplicity of strands 38 and 40 twisted together for reinforcement layers 34 and 36, respectively is shown in FIG. 5. The twisted yarn is applied as a braid about core tube 12, however, prior to application of the first braided reinforcement layer 34 about core tube 12, a non-solvent cement or adhesive, such as a urethane adhesive, is applied to core tube 12 so as to provide a firm bond between core tube 12 and reinforcement layer 34. A bonding agent, however, is not required between subsequent adjacent reinforcement layers because the twisted yarn causes reinforcement layers 34 and 36 to grip or interlock each other thus forming a mechanical bond therebetween. In addition, the outer sheath 18 forms a mechanical bond with the turns of the twisted yarn of the outermost reinforcement layer, however, an adhesive may be used therebetween to complement the mechanical bond. Since the core tube is bonded to the first reinforcement layer, and each reinforcement layer grips or is interlocked with its adjacent reinforcement layer due to the twisted reinforcement yarn, and the twisted yarn of the outermost reinforcement layer is mechanically and/or chemically bonded to the outer sheath, the complete hose structure is effectively bonded together and any relative longitudinal movement between the layers thereof during swaging is negligible, thus bunching of the reinforcement yarn does not occur. In addition, inasmuch as no bonding agent is used between reinforcement layers, the resulting hose structure is relatively flexible.

Variations of the present invention will be apparent to those having ordinary skill in the art and the invention is limited only by the spirit and scope of the following claims:

We claim:

1. A flexible composite hose comprising a core tube of synthetic thermoplastic material, two or more layers of fibrous reinforcement material disposed about said core tube, said two or more fibrous reinforcement layers being comprised of yarn twisted from one or more strands of said fibrous reinforcement material and having at last two twists per inch, said twisted yarn of each of said two or more fibrous reinforcement layers interlocking with said twisted yarn of the most adjacent reinforcement layers preventing relative longitudinal movement therebetween, said two or more reinforcement layers comprising a fist reinforcement layer bonded to said core tube and one or more reinforcement layers disposed about said first reinforcement layer in an unbonded relationship thereto and to each other, and a sheath of synthetic thermoplastic material covering said two or more layers of fibrous reinforcement material.

2. A hose as defined in claim 1 wherein said sheath of synthetic thermoplastic material forms a mechanical bond with the outermost layer of said two or more fibrous reinforcement layers.

3. A hose as defined in claim 1 wherein said first reinforcement layer is bonded to said core tube by an adhesive.

4. A hose as defined in claim 1 wherein said two or more fibrous reinforcement layers are applied as a braid about said core tube.

5. An improved connection between a swageable hose fitting and a hose comprising a core tube and two or more reinforcement layers of a fibrous twisted yarn disposed about said core tube, wherein the improvement comprises the interlocking of said twisted yarn of each of said two or more reinforcement layers with said twisted yarn of the most adjacent reinforcement layers preventing relative longitudinal movement therebetween during swaging of said fitting onto said hose.

* * * * *